(12) United States Patent
Cutcher et al.

(10) Patent No.: US 6,457,781 B1
(45) Date of Patent: Oct. 1, 2002

(54) RETAINING ARTICLE FOR WHEEL ORNAMENTATION

(75) Inventors: Douglas J. Cutcher, Bloomfield Hills; Ted E. Eikhoff, Grosse Pointe; Scott Shore, Clarkston, all of MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/780,284

(22) Filed: Feb. 9, 2001

(51) Int. Cl.[7] ................................................ B60B 7/14
(52) U.S. Cl. .............................. 301/37.371; 301/37.373
(58) Field of Search ..................... 301/37.102, 37.371, 301/37.372, 37.373, 108.1, 108.4

(56) References Cited

U.S. PATENT DOCUMENTS

| | | | |
|---|---|---|---|
| 3,092,421 A | | 6/1963 | Lyon |
| 4,133,583 A | | 1/1979 | Spisak |
| 4,316,638 A | | 2/1982 | Spisak |
| 4,457,560 A | * | 7/1984 | Rowe et al. |
| 4,458,952 A | * | 7/1984 | Foster et al. |
| 4,576,415 A | | 3/1986 | Hempelmann |
| 4,950,036 A | | 8/1990 | Patti |
| 5,249,845 A | | 10/1993 | Dubost |
| 5,286,092 A | | 2/1994 | Maxwell, Jr. |
| 5,297,854 A | | 3/1994 | Nielsen et al. |
| 5,595,422 A | * | 1/1997 | Ladouceur |
| 6,022,081 A | * | 2/2000 | Hauler et al. |
| 6,039,406 A | | 3/2000 | Sheu |
| 6,238,007 B1 | * | 5/2001 | Weiczorek et al. |

* cited by examiner

*Primary Examiner*—Russell D. Stormer
(74) *Attorney, Agent, or Firm*—Bliss McGlynn, P.C.

(57) ABSTRACT

A retaining article secures ornamentation, namely wheel caps and wheel covers, to a wheel. The retaining article is a unitary structure. It is received by the ornamentation which has an inboard surface with a number of protrusions extending out therefrom. The protrusions are cylindrical in shape. The retaining article has a ring with a number of openings. The openings receive the protruding cylinders therein and are secured thereto by a number of tabs. The tabs are bent by the protruding cylinders. Legs extend out from the ring. The legs are forced over lug nuts which secure the wheel to a wheel hub. The legs engage the lug nuts creating a positive engagement with the lug nuts. Standoff extensions abut the top of the lug nut preventing lost motion between the lug nuts and the ring.

12 Claims, 3 Drawing Sheets

RETAINING ARTICLE FOR WHEEL ORNAMENTATION

BACKGROUND OF THE INVENTION

1. Field of the Invention

The invention relates to ornamentation for vehicular wheels. More specifically, the invention relates to a retaining article to secure wheel ornamentation to vehicular wheels.

2. Description of the Related Art

Wheel ornamentation, such as wheel caps and covers (hereinafter "wheel covers") are aesthetic devices used to enhance the look of the wheels to which they are attached. Wheel covers are used because the manufacture, finish and mounting of a wheel cover to a wheel is less expensive than manufacturing a wheel having the same quality finish of a wheel cover. A chrome surface on a wheel cover is an inexpensive alternative to a chrome plated or polished wheel. In addition, wheel covers provide various types of appearances and styling variations, all of which may be combined with a single wheel design. The desirability of wheel covers is, however, directly proportional to the ability to inexpensively attach the wheel covers to the wheel permanently while adding little weight to the overall composite wheel.

U.S. Pat. No. 5,297,854, issued to Nielson et al. on Mar. 29, 1994, discloses a wheel cover retention system which incorporates a plurality of retainers secured to the wheel cover when it is mounted to a hollow protrusion extending out from the inboard surface of the wheel cover. The retainers receive lug nuts which hold the wheel in place. This system of wheel cover retention is undesirable because each retainer is an element independent of the other retainers. Inventory costs and assembly costs increase when dealing with so many pieces which fabricate a retention system.

U.S. Pat. 5,695,257, issued to Wright et al. on Dec. 9, 1997, discloses a retention system for a wheel cover. This system includes a ring having a number of attachments secured thereto allowing the wheel cover and the wheel to be attached to the ring keeping the wheel cover secured to the wheel. This system relies on bolts, nuts and attachment brackets. This system is undesirable because there are several parts to the system which require alignment and threading and the system is cumbersome to install and remove from the wheel. More specifically, for a user to access the wheel, the user must unbolt the four bolts which are shown holding the wheel cover to the ring and the four nuts shown securing the ring to the wheel. This task is tedious and undesirable.

SUMMARY OF THE INVENTION

A retaining article is used to secure ornamentation, having an inboard surface defining a plurality of protrusions, to a wheel. The wheel is secured to a wheel hub with a plurality of lug nuts. The retaining article includes a ring defining an outer periphery and an inner periphery. A plurality of openings extend through the ring between the outer and inner diameters. The plurality of openings receive each of the plurality of protrusions extending out from the inboard surface of the ornamentation. The ring also includes a plurality of legs which extend out therefrom to engage the lug nuts securing the ornamentation to the wheel.

One advantage associated with the invention is the ability to secure ornamentation to a wheel of a motor vehicle. Another advantage associated with the invention is the ability to secure ornamentation to a wheel using a single article. Yet another advantage associated with the invention is the ability to prevent noise generated from rattling of the ornamentation against the wheel.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
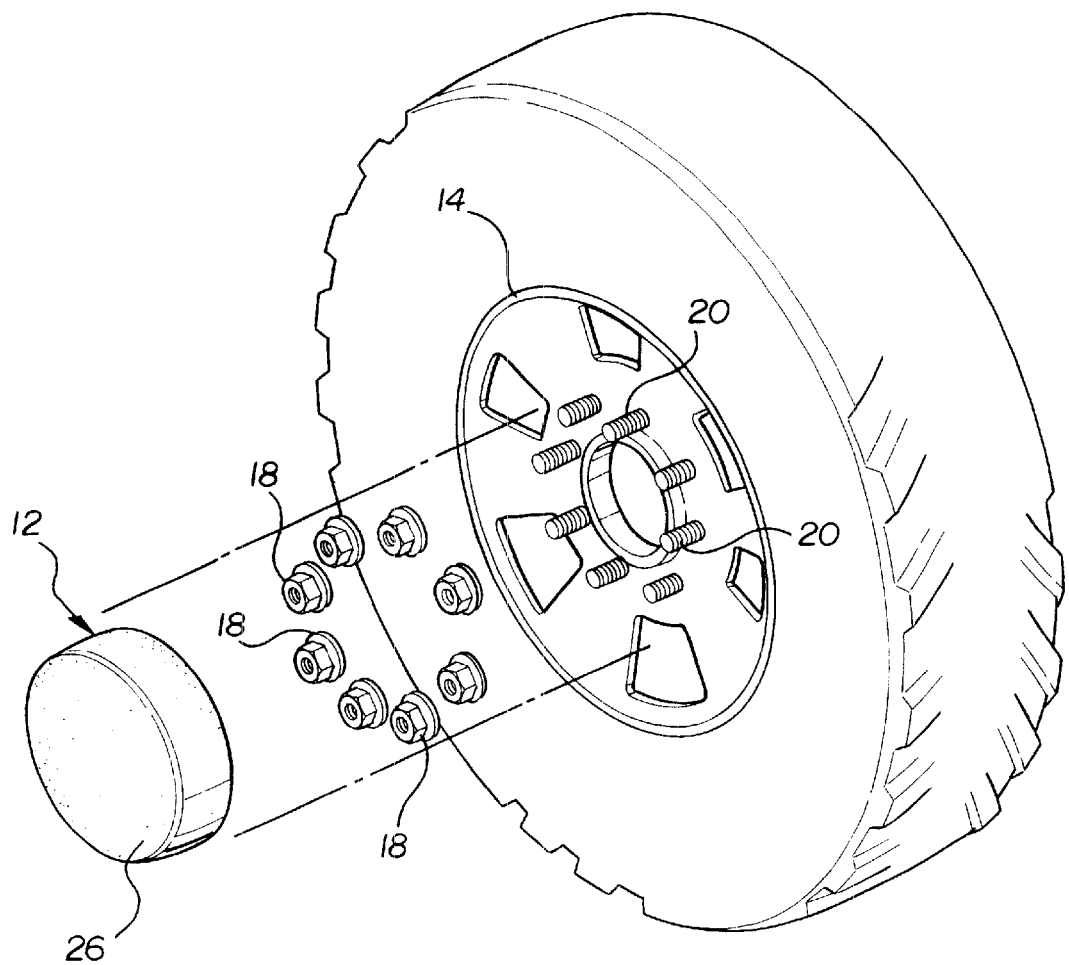
FIG. 1 is a an exploded perspective view of a wheel, wheel cover a wheel cap.
Figure 2:
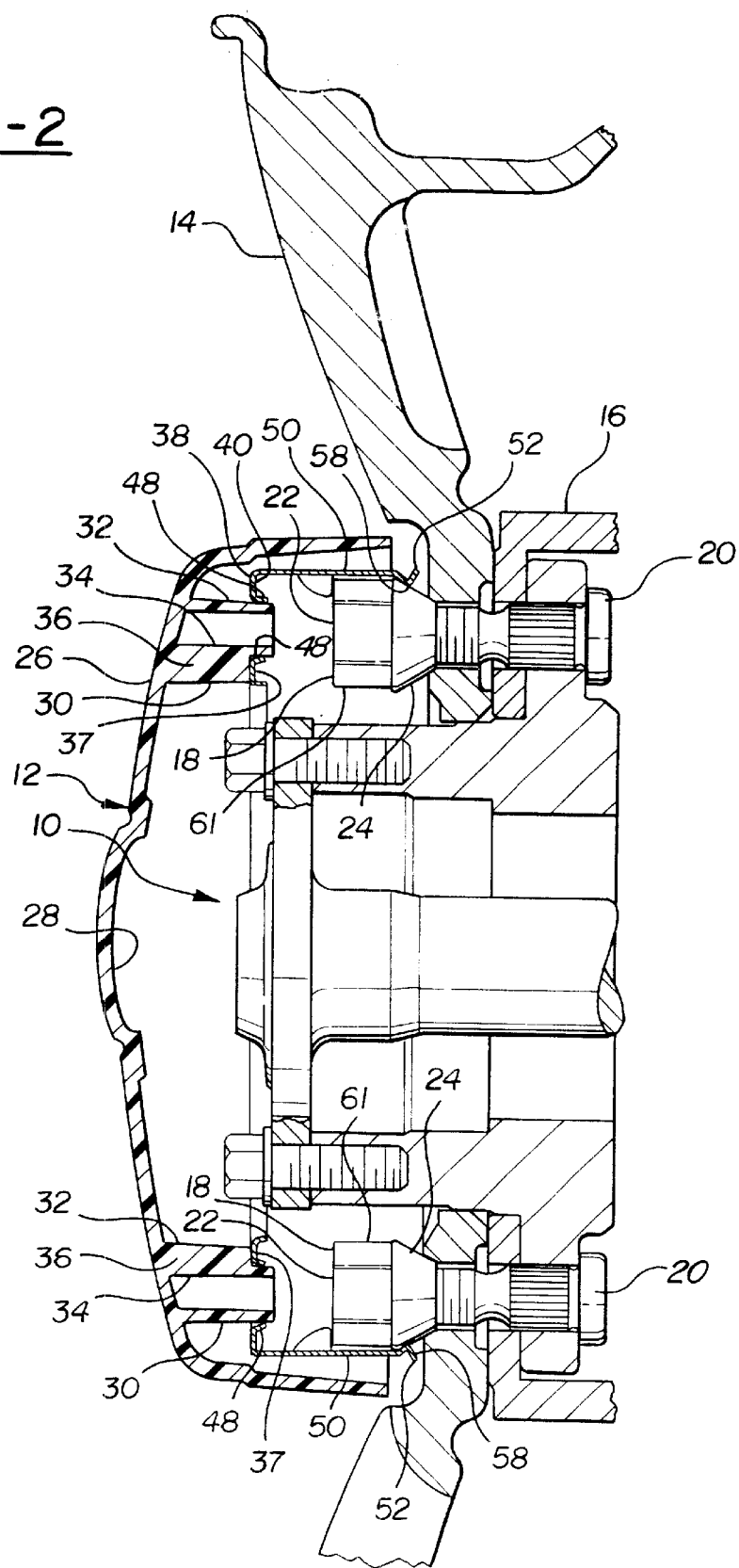
FIG. 2 is a cross-sectional side view partially cut away of one embodiment of the invention securing a wheel cap to a wheel.

Referring to the Figures, a retaining article is generally indicated at 10. The retaining article 10 is a unitary structure that retains ornamentation, generally indicated at 12, to a wheel 14. In the embodiment shown, the ornamentation 12 is a wheel cap. It should be appreciated by those skilled in the art that the retaining article 10 could be adapted to be used with other wheel ornamentation such as a wheel cover (not shown). The wheel 14 is secured to a wheel hub 16 with lug nuts 18 which threadingly engage lug studs 20. The lug nuts 18 include a top portion 22 and a chamfered surface 24.

The wheel cap 12 defines an outboard surface 26 and an inboard surface 28. Holes may extend between the outboard 26 and inboard 28 surfaces depending on the venting and aesthetic requirements. Typically, the outboard surface 26 is finished in a manner suitable for viewing by persons outside the motor vehicle to which the wheel cap 12 is attached. In many instances, it matches the appearance of the wheel cover.

Extending out from the inboard surface 28 are a plurality of protrusions 30. In the embodiment shown, the protrusions 30 are cylindrical in shape defining an outer protrusion surface 32 and an inner protrusion surface 34 and a wall 36 therebetween. Depending on the material used to fabricate the wheel cap 12, the thickness of the wall 36 of the protrusions 30 can only be approximately forty to fifty percent of the thickness of the wheel cap 12 between the inboard surface 28 and the outboard surface 26. If the thickness of the wall 36 is greater, it will create recesses in the outboard surface 26 detracting from the aesthetic quality of the outboard surface 26. Stop flanges 37 extend out from the wall 36 and will be discussed in greater detail subsequently.

Figure 3:
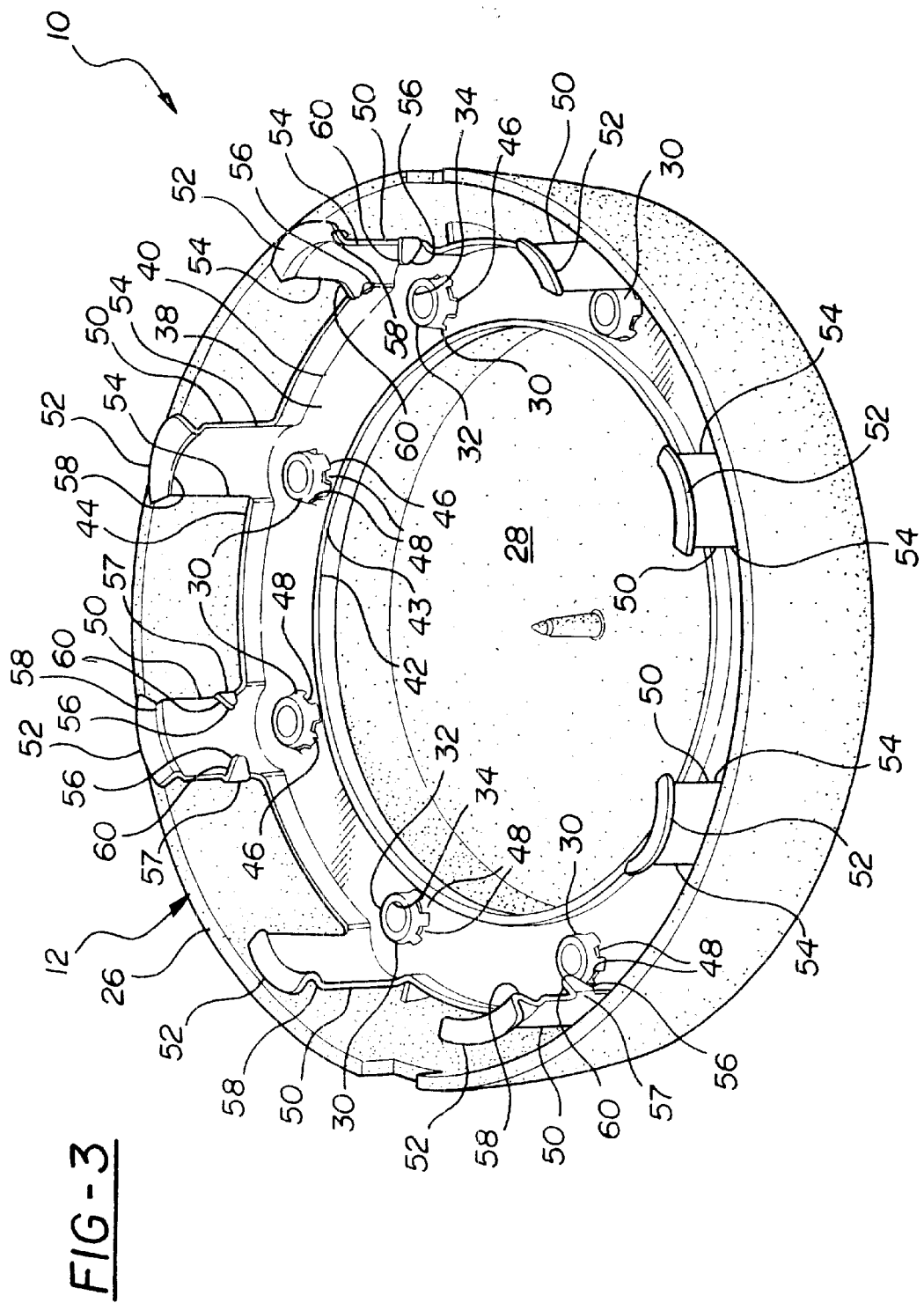
FIG. 3 is a perspective view of one embodiment of the invention.

The retaining article 10 includes a ring 38, best seen in FIG. 3. The ring 38 defines an outer ring periphery 40 and an inner ring periphery 42. The inner 43 and outer 44 edges of the ring 38 are bent under to increase the strength of the ring 38 while minimizing sharp edges.

The ring 38 includes a plurality of openings 46. The plurality of openings 46 receive the plurality of protrusions 30 therethrough locking the wheel cap 12 to the retaining article 10. A number of tabs 48 extend into the openings 46. The tabs 48 extend radially inwardly with respect to each of the openings 46. The tabs 48 are spaced along the periphery of the openings 46 and will frictionally engage the outer protrusion diameter 32 of the protrusions 30. The protrusions 30 bend the tabs 48 locking the wheel cap 12 to the retaining article 10. The ring 38 is forced over the protrusions 30 until it abuts the stop flanges 37. This abutment positions the ring 38 with respect to the lug nuts 18 to which the ring 38 will be secured.

Extending downwardly from the ring 38, the retaining article 10 includes a plurality of legs 50. The legs 50 include a cross section that extend through an arcuate path. The legs 50 extend out from the ring 38 and engage a portion of the lug nuts 18. Each of the legs 50 is spring biased inwardly to resiliently engage the lug nuts 18 such that the retaining article 10, and hence, the wheel cap 12, are secured to the wheel 14. Each of the legs 50 includes an outwardly extending distal end 52 which aids in the receipt of the lug nuts 18 into the retaining article 10. Each of the legs 50 is positioned such that it is aligned with a lug nut 18. The legs 50 are diametrically paired so that only one side of the lug nut 18 needs to be engaged thereby.

Each leg 50 defines two longitudinal sides 54. On a portion of the legs 50, the longitudinal sides 54 include a standoff structure 56. In the preferred embodiment, the portion of legs 50 include every other leg 50. More specifically, the legs 50 alternate between those that have the standoff structure 56 and those that do not.

The standoff structure 56 for each leg 50 includes two standoff extensions 57. The standoff extensions 57 are bent toward the center of the ring 38. Therefore, neither standoff extension 57 extends through the same plane. In the preferred embodiment, the planes through which the standoff extensions 57 extend are not parallel and, in fact, intersect each other.

Each standoff extension 57 includes an abutment surface 60. The abutment surface 60 abuts the top surface 22 of the lug nut 18 when the ring 38 is positioned for use. The abutment surface 60 is spaced from an indentation 58 the same distance as the length of the tool engaging portion 61 of the lug nut 18. This spacing eliminates any lost motion between the ring 38 and the lug nuts 18 resulting in an elimination of rattling noises and vibrations that may be generated thereby should the ring 38 not include the standoff structure 56.

Each of the legs 50 includes an indentation 58 which engages a chamfered surface 24 on the lug nut 18. It is the contact between the indentation 58 and the chamfered surface 24 that secures the wheel cap 12 to the wheel 14 through the retaining article 10.

The method for securing the wheel cap 12 to the wheel 14 using the retaining article 10 includes the step of stamping a piece of sheet metal to form a ring 38 having a plurality of openings 46. The ring 38 is then cut and portions of the ring 38 are bent downwardly to create the plurality of legs 50 which extend out from the ring 38 in a generally parallel direction with respect to the ring 38. The inner periphery 43 and the outer periphery 44 are pressed to increase the strength thereof. The legs 50 are bent such that they are able to receive lug nuts 18 therein when the retaining article 10 is secured to the wheel 14. The legs 50 are forced over the lug nuts 18, used to secure the wheel 14 to the wheel hub 16, to secure the retaining article 10 to the wheel 14.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A retaining article for securing ornamentation to a wheel secured to a wheel hub with a plurality of lug nuts, said retaining article comprising:

a ring for attachment to the ornamentation and having an outer ring periphery and an inner ring periphery;

a plurality of legs, having longitudinal sides, extending out from said ring and engaging the lug nuts; and a standoff structure extending out from at least one of said legs for engaging a top surface of the lug nuts and preventing said retaining article from moving with respect to the wheel.

2. A retaining article for securing ornamentation to a wheel secured to a wheel hub with a plurality of lug nuts, said retaining article comprising:

a ring having an outer ring periphery and an inner ring periphery;

a plurality of openings extending through said ring between said inner ring periphery and said outer ring periphery for receiving protrusions of the ornamentation therethrough;

a plurality of legs, having longitudinal sides, extending out from said ring and engaging the lug nuts;

a standoff structure extending out from at least one of said legs for preventing said retaining article from moving with respect to the wheel; and wherein said standoff structure includes a plurality of standoff extensions extending out from said longitudinal sides of said at least one of said legs.

3. A retaining article as set forth in claim 2 wherein each of said standoff extensions includes an abutting surface for abutting up against one of the lug nuts.

4. A retaining article as set forth in claim 2 wherein one of said standoff extensions extends out from each of said longitudinal sides of said at least one of said legs.

5. A retaining article as set forth in claim 2 wherein said longitudinal sides and said standoff extensions extending out therefrom are substantially perpendicular to each other.

6. A retaining article as set forth in claim 2 wherein said standoff extensions are bent in a radial direction.

7. A retaining article as set forth in claim 1 including a plurality of openings extending through said ring between said inner ring periphery and said outer ring periphery for receiving protrusions of the ornamentation therethrough and each of said openings including a plurality of tabs to engage each of the protrusions upon passing therethrough to secure said retaining article to the ornamentation.

8. A retaining article as set forth in claim 1 wherein each of said legs is spring biased inwardly to resiliently engage one of the lug nuts such that said retaining article is secured to the wheel.

9. A retaining article as set forth in claim 1 wherein each of said legs includes an outwardly extending distal end to receive one of the lug nuts and allow each of said legs to pass over the lug nuts as said retaining article is secured to the wheel.

10. A retaining article as set forth in claim 1 wherein each of said legs extends through an arcuate path.

11. A retaining article as set forth in claim 1 wherein said ring includes a ridge extending along said outer ring periphery.

12. A retaining article and ornamentation assembly for securement to a wheel secured to a wheel hub with a plurality of lug nuts, said retaining article and ornamentation assembly comprising:

an ornamentation having a plurality of protrusions;

a ring having an outer ring periphery and an inner ring periphery;

a plurality of openings extending through said ring between said inner ring periphery and said outer ring periphery for receiving said protrusions of said ornamentation therethrough;

a plurality of legs, having longitudinal sides, extending out from said ring and engaging the lug nuts;

a standoff structure extending out from at least one of said legs for preventing said retaining article from moving with respect to the wheel;

wherein said standoff structure includes at least one standoff extension extending out from at least one of said longitudinal sides of said at least one of said legs; and wherein said ornamentation is a wheel cap.

* * * * *